June 1, 1948.　　　E. W. SWIATEK　　　2,442,554

COUNTERSINK AND CENTER REAMER

Filed Jan. 1, 1945

INVENTOR
Edward W. Swiatek
BY
Wooster & Davis
ATTORNEYS.

Patented June 1, 1948

2,442,554

UNITED STATES PATENT OFFICE 2,442,554

COUNTERSINK AND CENTER REAMER

Edward W. Swiatek, Bridgeport, Conn.

Application January 1, 1945, Serial No. 570,850

4 Claims. (Cl. 77—73.5)

This invention relates to a countersink or center reamer, and has for an object to provide a device of this character which is so shaped that it will not chatter in use, as is the fault of standard countersinks or center reamers now generally employed, resulting in a rough surface, and also with danger of breaking the countersink or reamer; but will produce a smooth, perfectly round hole with no danger of the countersink or reamer digging in to spoil the work.

It is also an object to provide a construction which is easier and less expensive to make than the standard reamer or countersink, and which can be much more easily and quickly ground and sharpened properly and accurately.

With the foregoing and other objects in view, I have devised the construction illustrated in the accompanying drawing forming a part of this specification. It is, however, to be understood the device is not limited to the specific details of construction and arrangement shown, but may embody various changes and modifications within the scope of the invention.

Figure 1:
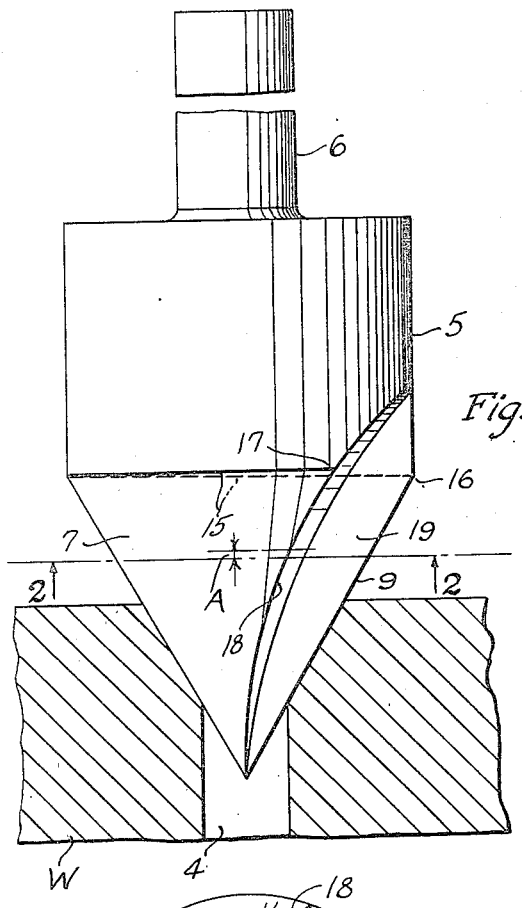
Fig. 1 is a side elevation of a countersink or center reamer on an enlarged scale showing a member being operated upon in section.

In the standard countersink or center reamer now generally employed, the taper is provided with three flutes or grooves forming three cutting edges, and the narrow inclined surface strip back of each cutting edge is relieved with considerable clearance or relief, so that when working, in effect the support is really on the three cutting edges only and the three cutting edges cut simultaneously. Such a reamer is apt to dig into the work, causing it to chatter, making chatter marks on the resulting countersunk portion of the opening, giving a rough and unsatisfactory surface. Also because of this tendency to dig in, there is danger of its breaking, and such a construction is relatively expensive to make and difficult to sharpen properly as all three cutting edges and adjacent surfaces must be ground exactly alike.

These difficulties are eliminated with my new construction. A piece of work is shown at W with an opening at 4 to be countersunk or center reamed. The improved device comprises a body or head shown at 5 with a shank 6 for mounting in the usual chuck or holder, and the tapered surface is shown at 7 with a single flute or groove 8 and therefore a single cutting edge 9. This may be substantially straight as shown, or it could be undercut somewhat if desired. In grinding this tapered surface 7, instead of grinding it straight so that the tapered surface 7 is a straight conical surface and the transverse sections at right angles to the axis are true circles, it is ground on a spiral with a small lead. This lead can vary considerably but is preferably relatively small. It is preferably from about .006 in. to .012 in., but could vary somewhat from this range. For example, if we use a lead of, say, .008 in. per revolution, the point 10 on the section 2—2 would be .008 in. below the point 11 along the tapered surface (as indicated at A) where it would be if the taper 7 were a straight concentric taper and the section a perfect circle. Thus, a small amount of metal on any given section at right angles to the axis, such for example as from the point 12 on the section 2—2, is ground off around the tapered surface to the opposite side of the flute. Thus, a small amount of metal is ground from the point 12 around the tapered surface to the point 10, as indicated by the exaggerated spacing between the full line 13 and the dotted line 14, the dotted line 14 indicating the circumference of the section were the taper a straight conical taper and the section a true circle. The full line 13, therefore, indicates the shape of the section with this relief, and it is carried throughout the entire taper. Thus, the top line 15 indicating the junction between the taper and the cylindrical portion of the head, instead of being a horizontal line as it would be with a true conical straight taper 7, is gradually inclined upwardly in a spiral from the point 16 around the circumference of the head to the point 17, the amount depending on the lead per revolution of the spiral of the grinding operation. This spiral grinding operation with the lead selected is employed in grinding the entire tapered surface 7.

Because of this arrangement, the relief is spread throughout the whole tapered surface from the cutting edge 9 all the way around to the rear edge 18 of the flute. Because of this, in the countersinking or reaming operation the depth of cut of the cutting edge can equal only the amount of the lead, and the support is entirely around the tapered surface. Because of this, it is impossible for the cutting edge to dig in an amount greater than the lead, and thus chatter and breaking of the device is prevented. Also, as digging in and chatter are prevented, a smooth round hole is produced. In other words, with this surface ground on a spiral, the device tends to pull itself or hold into the work, and as, because of the small lead, it cannot dig in, it acts similar to a screw going in and the depth of cut cannot be greater than the lead.

Also because there is only one flute, instead of three as in the standard countersink or reamer, it is much cheaper to make as there is only one milling operation and it is not necessary to make several flutes exactly alike. It is furthermore much easier to grind and sharpen, because all that is necessary is to grind the inner surface 19 in front of the cutting edge 9, and it may be readily sharpened by hand, while with the standard reamer or countersink with three flutes each edge must be ground exactly like each of the others and the relief or clearance on the narrow strip back of each cutting edge must also be the same for each. In the standard reamer it is difficult to grind all three edges accurately and alike. This new device, therefore, is much cheaper to make, is much easier to grind accurately and therefore can be ground much more quickly, and for the reasons given it produces a much better job with a much smoother and rounder surface with practically no danger of breaking in normal operation, even though it is handled more roughly and used for more rapid operation, because it contacts and therefore is supported on the surface of the hole being cut all the way around the taper, and thus prevents chatter.

Figure 3:
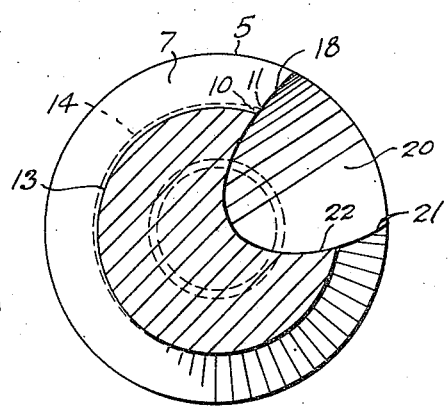
Fig. 3 is a similar section showing a slight modification.
Figure 2:
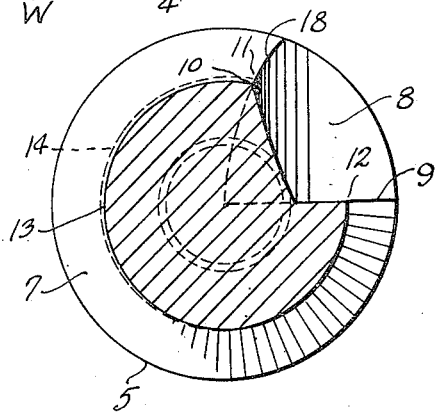
Fig. 2 is a transverse section substantially on line 2—2 of Fig. 1.

Fig. 3 shows a slight modification in which the flute 20 instead of comprising a flat surface on one side in front of the cutting edge 21, is curved throughout its entire transverse surface as indicated, thus producing a somewhat more undercut surface 22 immediately forward of the cutting edge. Otherwise this device is the same, operates the same and has the same advantages as the device of Figs. 1 and 2, the tapered surface 7 being ground on a spiral with a small lead, the same as described for the device of Figs. 1 and 2.

Having thus set forth the nature of my invention, what I claim is:

1. A countersink or center reamer comprising a body having a tapered end portion provided with a single longitudinal flute providing a cutting edge, said tapered portion being formed on a spiral with a small lead per revolution providing a corresponding gradually increasing relief from the cutting edge around the curved surface of the taper to the opposite edge of the flute to support the countersink or reamer on the opening and prevent a depth of cut greater than the amount of the relief.

2. A countersink or center reamer comprising a body having a tapered end portion provided with a single longitudinal flute or groove providing a single cutting edge on said tapered portion, said tapered portion being formed on a spiral with a lead of about .006 in. to about .012 in. providing a corresponding gradually increasing relief distributed from the cutting edge around the surface of the taper to the opposite edge of the flute or groove.

3. A countersink or center reamer comprising a body having a tapered end portion provided with a single longitudinal flute or groove providing a single cutting edge on said tapered portion, and said tapered portion being relieved with a small gradually increasing relief evenly distributed from the cutting edge around the curved surface of the taper to the opposite edge of the flute or groove.

4. A countersink or center reamer comprising a body having a tapered end portion provided with a single longitudinal flute or groove in one side thereof forming a single longitudinal cutting edge at one side of said flute or groove, and said tapered portion being formed on a spiral with a small lead per revolution providing a corresponding gradually increasing relief from the cutting edge around the surface of the tapered portion to the opposite edge of the flute or groove and the periphery of any transverse section of the taper at right angles to its axis is that much relieved from a true circle concentric with said axis and with the point of the cutting edge in the section located in its circumference.

EDWARD W. SWIATEK.

REFERENCES CITED

The following references are of record in the file of this patent:

UNITED STATES PATENTS

| Number | Name | Date |
|---|---|---|
| 1,323,278 | Hoaglund | Dec. 2, 1919 |
| 1,379,853 | Cogsdill | May 31, 1921 |
| 1,467,491 | Oliver | Sept. 11, 1923 |
| 1,923,177 | Tucker | Aug. 22, 1933 |
| 2,289,065 | Oliver | July 7, 1942 |
| 2,317,615 | Johnson | Apr. 27, 1943 |